United States Patent
Rivers et al.

(10) Patent No.: US 12,470,055 B2
(45) Date of Patent: Nov. 11, 2025

(54) DOWNLOADABLE FIRMWARE FOR PROGRAMMABLE CIRCUIT BREAKERS

(71) Applicant: ABB Schweiz AG, Baden (CH)

(72) Inventors: Cecil Rivers, Bloomfield, CT (US); Maggie Shao, Bloomfield, CT (US)

(73) Assignee: ABB SCHWEIZ AG, Baden (CH)

( * ) Notice: Subject to any disclaimer, the term of this patent is extended or adjusted under 35 U.S.C. 154(b) by 427 days.

(21) Appl. No.: 18/058,491

(22) Filed: Nov. 23, 2022

(65) Prior Publication Data
US 2024/0170941 A1    May 23, 2024

(51) Int. Cl.
*H02H 3/00* (2006.01)
*G06F 8/65* (2018.01)
*H02H 1/00* (2006.01)

(52) U.S. Cl.
CPC ............. *H02H 1/0092* (2013.01); *G06F 8/65* (2013.01); *H02H 3/006* (2013.01)

(58) Field of Classification Search
None
See application file for complete search history.

(56) References Cited

U.S. PATENT DOCUMENTS

| | | | |
|---|---|---|---|
| 6,868,349 B2* | 3/2005 | Fletcher | G08C 17/02 702/62 |
| 7,558,038 B2 | 7/2009 | Wiese et al. | |
| 2009/0217257 A1* | 8/2009 | Huang | G06F 8/65 711/E12.001 |
| 2019/0140429 A1 | 5/2019 | Mascarenhas et al. | |
| 2019/0140439 A1 | 5/2019 | Mascarenhas et al. | |
| 2022/0137952 A1* | 5/2022 | Abels | H04W 4/30 717/168 |
| 2023/0060908 A1* | 3/2023 | Wang | G06F 9/4408 |

* cited by examiner

*Primary Examiner* — Paul B Yanchus, III
(74) *Attorney, Agent, or Firm* — Greenberg Traurig, LLP; Vishak Ganesh

(57) ABSTRACT

A device may determine, by a microprocessor, whether the circuit breaker is performing a task which is already in progress, wherein when the determine is that the circuit breaker is performing the task, store the second firmware data to a second location of the memory. A device may receive, by a circuit breaker, a second firmware data transmitted from a computing device, wherein the circuit breaker already has a first firmware data stored in a first location of memory. A device may the first location of the memory being a firmware location for execution to operate the circuit breaker according to the first firmware data. A device may set, by the microprocessor, the second location of the memory as the firmware location, wherein the reset of the circuit breaker executes the second firmware data at the second location to operate the circuit breaker according to the second firmware data.

16 Claims, 4 Drawing Sheets

DOWNLOADABLE FIRMWARE FOR PROGRAMMABLE CIRCUIT BREAKERS

FIELD

This disclosure relates generally to circuit breakers. More particularly, this disclosure relates to systems and methods for updating firmware on a circuit breaker using a wireless connection or the like.

BACKGROUND

A circuit breaker is an electrical safety device designed to protect an electrical circuit from damage caused by an electrical fault. Circuit breakers are utilized in buildings to disable the electrical current to protect the electrical circuit from overheating and acts as a safeguard to prevent damage and electrical fires.

SUMMARY

In some embodiments, the method includes determining, by a microprocessor of a circuit breaker, whether the circuit breaker is performing a task which is already in progress. In some embodiments, when the determining is that the circuit breaker is performing the task, the method includes storing a second firmware data to a second location of the memory. In some embodiments, a method includes receiving, by the circuit breaker, the second firmware data transmitted from a computing device. In some embodiments, the circuit breaker already has a first firmware data stored in a first location of memory. In some embodiments, the first location of the memory is a firmware location for execution to operate the circuit breaker according to the first firmware data. In some embodiments, the method includes setting, by the microprocessor of the circuit breaker, the second location of the memory as the firmware location. In some embodiments, resetting of the circuit breaker executes the second firmware data at the second location to operate the circuit breaker according to the second firmware data.

In some embodiments, the method includes outputting a notification indicating that the execution the second firmware data is complete.

In some embodiments, the circuit breaker is a low-voltage circuit breaker.

In some embodiments, resetting of the circuit breaker is a software reset.

In some embodiments, when the determining is that the circuit breaker is performing the task, the second firmware data is prevented from being stored to the second location of the memory of the circuit breaker.

In some embodiments, the second firmware data stored to the second location of the memory of the circuit breaker is prevented from being executed in response to the resetting not being completed.

In some embodiments, the resetting is in response to receiving an indication of a test button being depressed on the circuit breaker.

In some embodiments, in response to a test initiated by the test button being depressed failing, the method includes preventing the second firmware data from being loaded.

In some embodiments, the circuit breaker and the computing device are connected to each other via a wireless interface.

In some embodiments, a method includes establishing a communication between a transmitting device and a circuit breaker. In some embodiments, transferring a firmware from the transmitting device to a wireless communication module of the circuit breaker. In some embodiments, determining whether a microprocessor of the circuit breaker is performing a critical task. In some embodiments, in response to the microprocessor of the circuit breaker not performing the critical task, the method transferring a portion of the firmware from the wireless communication module of the circuit breaker to a memory of the microprocessor of the circuit breaker. In some embodiments, determining whether the firmware is complete. In some embodiments, in response to the firmware being complete, a transmit complete signal is sent to at least one of the transmitting device or the circuit breaker.

In some embodiments, the method, further including: in response to the firmware being incomplete, determining whether the microprocessor of the circuit breaker is performing the critical task.

In some embodiments, the method, further including: in response to the microprocessor of the circuit breaker performing the critical task, delaying transferring the firmware until the critical task is complete.

In some embodiments, the method further including: setting an indicator at the memory of the microprocessor of the circuit breaker, the indicator indicating that the firmware is complete.

In some embodiments, the indicator is a flag.

In some embodiments, the flag indicates a location of a most recent downloaded firmware to be used upon a reset.

In some embodiments, in response to the reset, reading the flag by the microprocessor of the circuit breaker to determine where the most recent downloaded firmware is stored.

In some embodiments, the most recent downloaded firmware is executed by the circuit breaker.

In some embodiments, the firmware is downloaded onto the transmitting device from a remote device using the wireless communication module.

In some embodiments, the remote device is a mobile computing device.

In some embodiments, a device includes a memory. In some embodiments, a device includes a processor operatively coupled to the memory. In some embodiments, determine by a microprocessor of a circuit breaker, whether the circuit breaker is performing a task which is already in progress. In some embodiments, when the determine by the microprocessor of the circuit breaker is that the circuit breaker is performing the task, storing a second firmware data to a second location of the memory. In some embodiments, the processor configured to receive by the circuit breaker. In some embodiments, the second firmware data transmitted from a first computing device. In some embodiments, the circuit breaker already has a first firmware data stored in a first location of the memory. In some embodiments, the first location of the memory being a firmware location for execution to operate the circuit breaker according to the first firmware data. In some embodiments, set the microprocessor of the circuit breaker, the second location of the memory as the firmware location, wherein a reset of the circuit breaker executes the second firmware data at the second location to operate the circuit breaker according to the second firmware data.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Figure 1:
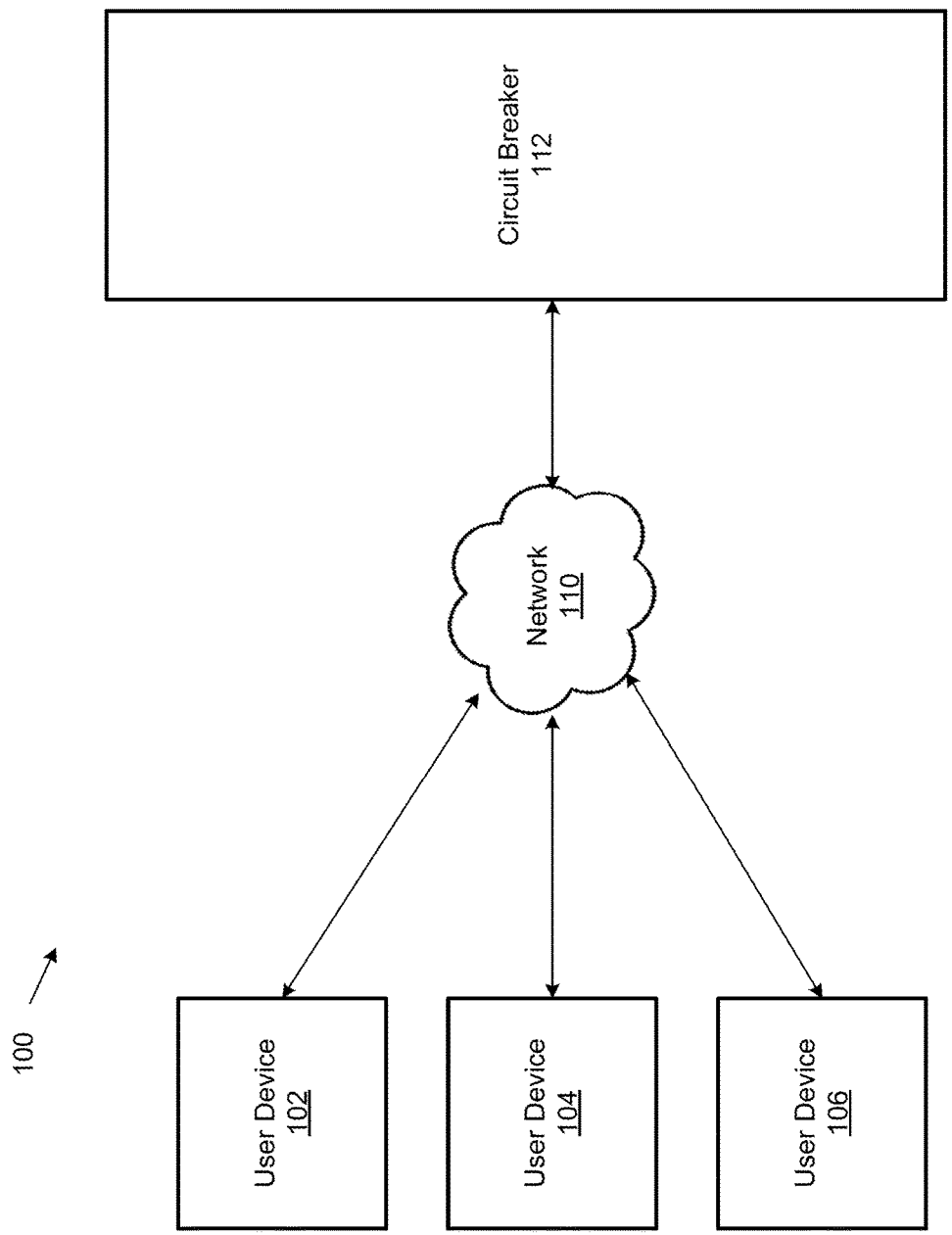
FIG. 1 shows an example system for downloading firmware to a circuit breaker, according to some embodiments.

This disclosure relates to the wireless programming of circuit breakers with communications and processing capabilities.

Electronic circuit breakers can be programmed at the manufacturer level to carry out safety functionalities, such as detecting faults and issuing trips. If a circuit breaker fails (e.g., by nuisance tripping), the circuit breaker must be either replaced or returned for rework. This is costly in terms of computing resources and time for both the consumer and the circuit breaker manufacturer. Further, reprogramming is beneficial for adding new and improved features to make the circuit breaker run more efficiently, such as energy metering.

Smart circuit breakers can provide capabilities such as wireless communication. A smart device is an electronic device generally connected to other devices or networks via various wireless protocols, such as Bluetooth, Zigbee, and the like. As a result, data can be transferred from the load center to the consumer via network to a computing device such as, but not limited to, a mobile device, a personal computer, or the like. Further, it opens an opportunity to conduct remote/wireless software updates. However, connecting devices to publicly accessible networks introduces new risks. Per industry standards, remote software updates cannot compromise safety or functionality of the circuit breakers.

Embodiments of this disclosure include a wireless communication system and software transfer between an electronic circuit breaker and a transmitting device. The system can include an electrical distribution center, an electronic circuit breaker capable of wireless communication, and a device configured to store and transmit firmware or programs to a connected circuit breaker. In some embodiments, this can enable reprogramming of the circuit breaker without physical access to the circuit breaker's hardware or a dedicated reprogramming device. In some embodiments, the circuit breaker can be programmed with wireless devices such as a smartphone, a computer, or the like, resulting in a more cost-efficient and straightforward solution.

In some embodiments, the transfer of the data to the circuit breaker does not interrupt the protection functions of the circuit breaker while the data is being transferred from the transmitting device (e.g., smartphone/PC). In some embodiments, the received firmware needs to be written to the microprocessor to complete the update. In some embodiments, the microprocessor can have one memory location holding the presently executed program and one or more other memory locations to store the updated firmware.

In some embodiments, the updated firmware can be downloaded and stored using the transmitting device. Once the transmitting device is in communication with desired circuit breakers wireless communication module, the updated firmware can be transferred to the circuit breaker. The wireless communication module can be a wireless device coupled to a microprocessor to enable wireless communication (e.g., Bluetooth, WiFi, Zigbee, etc.). In some embodiments, the wireless communication module can be a standalone component or integrated with the microprocessor. In some embodiments, once a connection is established, the updated firmware can be uploaded to the wireless communication module from the transmitting device.

In some embodiments, the microprocessor can read a received buffer during the low-priority background processes and transfer the packet to the appropriate processor memory location. After the program is transferred from the remote device to the microprocessor, the stored program may not be accessed until the circuit breaker has been reset (e.g., power has been cycled on the circuit breaker or the like). Once the program has been transferred, a flag can indicate a location of the most current program to be used upon completion of the reset. In some embodiments, after the reset, the processor can read the flag and determine from which memory location to retrieve the execution program.

FIG. 1 shows an example system 100 for downloading firmware to a circuit breaker, according to some embodiments. It is to be appreciated that updates other than firmware updates may be possible using the systems and methods described in this Specification. In the illustrated embodiment, the system 100 includes user devices 102, 104, 106, and a circuit breaker 112. It is to be appreciated that the number of user devices 102, 104, 106 can vary beyond the illustrated number of three. That is, in some embodiments, there can be fewer than three user devices 102, 104, 106, and in some embodiments, there can be more than three user devices 102, 104, 106.

The user devices 102, 104, and 106 may be one or more computing devices that can include a mobile computer, desktop computer, or other computing device used by a user to generate or receive data. For example, in some embodiments, the user devices 102, 104, 106 can include, but are not limited to, a tablet device; a wearable device such as a smartwatch or the like; or the like. In some embodiments, the circuit breaker 112 and the devices 102, 104, and 106 are connected in electronic communication via a wireless interface.

In some embodiments, the user device 102 can be used by an operator to transfer firmware stored on the user device 102 to a microprocessor (e.g., microprocessor 202 as shown and described in additional detail in accordance with FIG. 2 below) of the circuit breaker 112. In some embodiments, the operator can be a technician such as, but not limited to, an electrician or the like. In some embodiments, the operator may not be a technician. For example, in some embodiments, a building owner or the like can be the operator.

The user devices 102, 104, and 106 can communicate with the circuit breaker 112 through network 110 to transfer data, such as firmware. The circuit breaker 112 can also obtain data or output data to other computing devices, such as, but not limited to, a server device or the like and which can correspond to any electronic data acquisition processes (e.g., from third parties through an application programming interface—API).

In some embodiments, the network 110 can be the Internet or the like. In some embodiments, the network 110 can be a cellular network. In some embodiments, the network 110 can be configured for communication protocols including, but not limited to, Bluetooth, Zigbee, WiFi, combinations thereof, or the like.

The circuit breaker 112 can be managed by, or otherwise associated with, an enterprise (e.g., a utility company) that uses the system 100 for programming and managing circuit breaker processes. In some embodiments, the circuit breaker 112 can receive data from one or more of the user devices 102, 104, and 106.

In some embodiments, the circuit breaker 112 can be a low-voltage circuit breaker. In some embodiments, the circuit breaker 112 can be a residential circuit breaker. In some embodiments, the circuit breaker 112 can be utilized in a non-residential building such as, but not limited to, a commercial or industrial building or the like.

Figure 2:
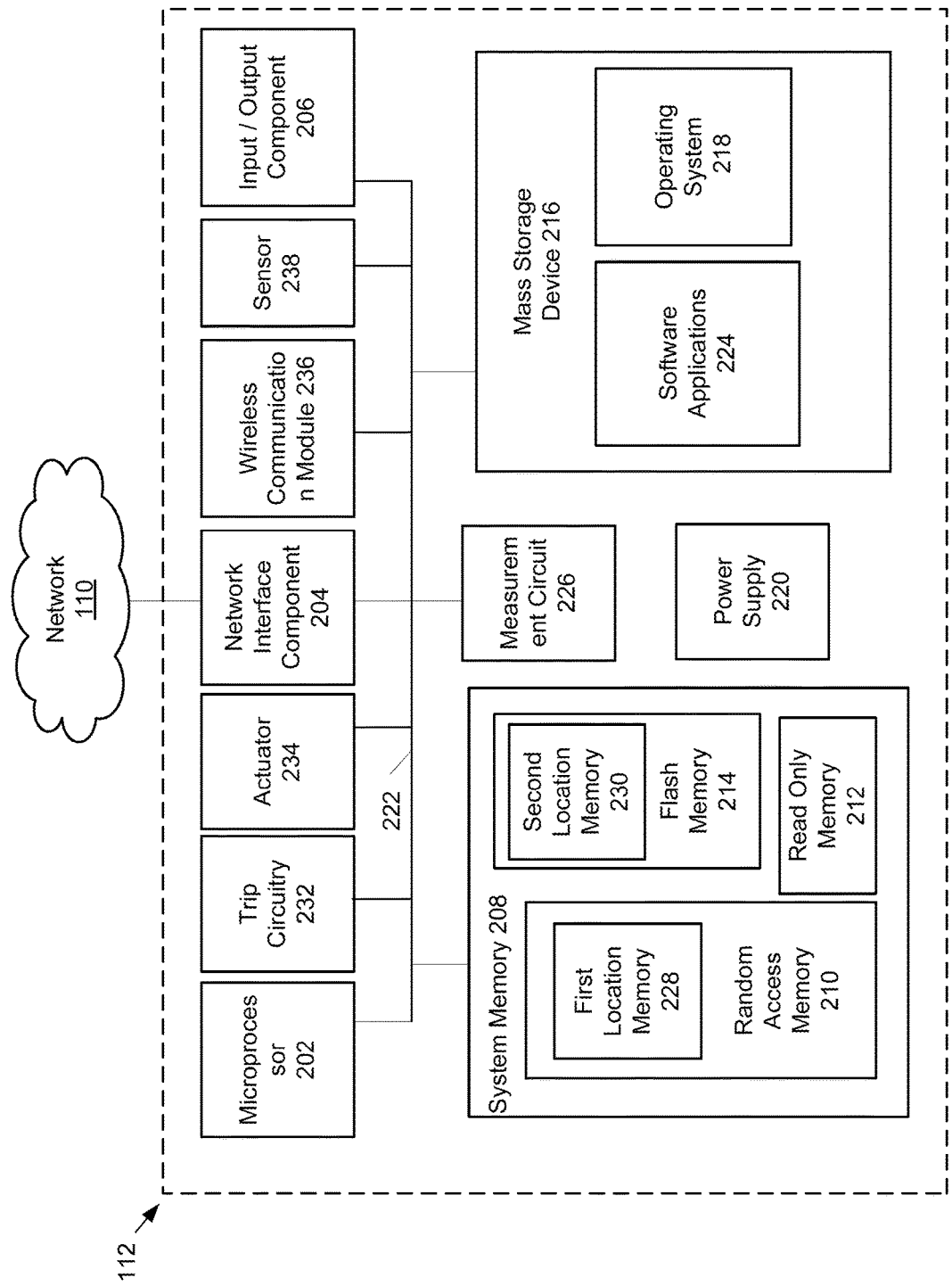
FIG. 2 shows example components and architecture of the circuit breaker of the system of FIG. 1, according to some embodiments.

FIG. 2 shows example components and architecture of the circuit breaker 112 of the system 100 of FIG. 1, according to some embodiments.

In some embodiments, the circuit breaker 112 includes microprocessor 202, network interface component 204, input/output component 206, system memory 208, random access memory 210, read-only memory 212, flash memory 214, a mass storage device 216, operating system 218, power supply 220, system bus 222, software applications 224, measurement circuit 226, first location memory 228, second location memory 230, trip circuitry 232, actuator 234, wireless communication module 236, and sensor 238. It is to be appreciated that the architecture of the circuit breaker 112 is an example and that the circuit breaker 112 can have variations in the architecture but still function according to the principles of this Specification.

In some embodiments, firmware that is transferred from the user device 102, 104, or 106 can be received by the microprocessor 202 of the circuit breaker 112 that is executing protection algorithms, such as an arc fault or ground fault, where loose connections or faulty wiring cause sparking or arcing, resulting in a dangerous situation that can cause electrical fires. In some embodiments, the microprocessor 202 can include a single processor, multiple processors, a processor with multiple cores, combinations thereof, or the like. In some embodiments, to ensure that the protection algorithm processing is not disrupted, the microprocessor 202 can receive a data transfer when the protection algorithm is not being executed. Once the data is downloaded to the second location memory 230, the circuit breaker 112 is reset, allowing the transfer to the location where the new firmware resides, as discussed below.

The wireless communication module 236 uses the network 110 to communicate with the user devices 102, 104, and 106 to download the firmware, while the microprocessor 202 runs safety functions. When the microprocessor 202 is in its background state, the microprocessor 202 requests data (i.e., the firmware) from the wireless communication module 236, then when the microprocessor 202 is back in its foreground state, the data transfer will halt. Once all the data is transferred over, that data will be moved to a portion of flash memory 214.

The foreground state is where critical operations and tasks are run. Various foreground tasks have higher priorities than others. During the transfer of firmware, operating at the lowest priority, the background task cannot impact any activities that the foreground task is processing. The background tasks include reading transferred data, writing transferred data to second location memory 230 on the flash memory 214, and setting a flag pointing to the appropriate memory location. The wireless communication module 236 can receive the firmware from the user devices 102, 104, and 106 regardless of the continuous function of the microprocessor 202.

A critical task can be a circuit protection that is safety-related and considered crucial. In some embodiments, a critical task can include any tasks that are related to electrical distribution and protection. For example, a ground fault circuit breaker may run a ground protection fault algorithm as a critical task.

Once the microprocessor 202 receives the firmware, it is transferred to random-access memory ("RAM") 210 or flash memory 214. In one embodiment, the firmware would initially be assigned to RAM 210 and then transferred over to flash memory 214. In another embodiment, the firmware would be directly transferred to the flash memory 214 without touching RAM 210. Flash memory 214 operates as programmable memory, where the firmware must reside to be executed and retained after a reset or power cycle. In some embodiments, a software reset can initiate power cycling through the microprocessor 202 remotely. In some embodiments, power cycling can occur in response to the depression of a button on the circuit breaker 112. In some embodiments, the reset is in response to receiving an indication of a test button being depressed on the circuit breaker 112. In some embodiments, in response to a test initiated by the test button being depressed failing, the second firmware data can be prevented from being loaded to the memory location 228, 230. In some embodiments, power cycling can occur by physically opening and closing the handle on the circuit breaker 112. For example, the handle of the circuit breaker 112 can be toggled to power the circuit breaker 112 on or off.

Once the circuit breaker is reset, a flag indicates the location in the memory where the firmware is located within the flash memory 214. This location is the second location of memory 230. When the reset occurs, the system can monitor where the firmware has been stored. In some embodiments, if there is a failure in the transfer of the firmware, the flag will point to the original firmware location. In some embodiments, where the background task is processing, and only a portion of the firmware is successfully transferred, the flag will be updated to identify the new firmware location on the second location memory 230. The flag will point to the second location of memory 230 once the complete firmware is transferred from the first location of memory 228 or the wireless communication module 236.

In some embodiments, if the circuit breaker 112 is connected to the network 110, it may be possible to transmit the firmware update to all connected circuit breakers 112. This can be advantageous in an instance in which, for example, a software issue is detected on the firmware to circuit breakers 112 of a particular type or running a particular version of firmware, so that a new firmware update can be output to all circuit breakers 112 of the particular type from a central location, using the wireless communication module 236. For example, point-to-point contact between a technician and a customer can occur using a smart panel installed on the bottom of the circuit breaker 112, where the enterprise may push and receive data to and from.

The circuit breaker 112 may include the power supply 220. In some embodiments, the power supply 220 converts an AC voltage to a regulated DC voltage for use by some or all electrical components connected to the circuit breaker 112.

The circuit breaker 112 may include the sensor 238. In some embodiments, the sensor 238 may be coupled to the circuit breaker 112. In some embodiments, information from the sensor 238 (e.g., IoT devices, temperature sensors, weather monitors, security systems, location information, etc.) can be included in the analysis of the historical data indicated in database 118 to provide alerts, updated firmware, updated fault tripping settings.

The circuit breaker 112 may include a measurement circuit. In some embodiments, the microprocessor 202 can be arranged to execute power metering instructions to aid in performing one or more techniques described herein, such as causing the circuit breaker 112 to collect operating metrics (e.g., current measurements, voltage measurements, power measurements, or the like) and send the collected operating metrics to a remote entity, such as the enterprise (e.g., directly or via wireless communication module 236, or the like).

The circuit breaker 112 may include trip circuitry 232. In some embodiments, the trip circuitry 232 is the part of the circuit breaker 112 that opens the circuit in the event of an electrical fault.

The circuit breaker 112 may include the actuator 234. In some embodiments, the actuator 234 is positioned to trip (i.e., unlatch) the operating mechanism of the circuit breaker 112 in response to receiving an electrical trip signal from trip circuitry 232. When the operating mechanism is tripped by the actuator 234, the operating mechanism separates each electrical contact to stop the flow of electrical current.

As illustrated in FIG. 2, circuit breaker 112 includes at least one microprocessor 202, the system memory 208, and the system bus 222 that couples the system memory 208 to the microprocessor 202. The system memory 208 includes the RAM 210, the ROM 212, and flash memory 214. An input/output system containing the routines that help transfer information between elements within the circuit breaker 112, such as during startup, is stored in the ROM 212. The circuit breaker 112 further includes a mass storage device 216. The mass storage device 216 can store software instructions and data.

The mass storage device 216 is connected to the microprocessor 202 through a mass storage controller (not shown) connected to the system bus 222. The mass storage device 216 and its associated computer-readable data storage media provide non-volatile, non-transitory storage for the circuit breaker 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the circuit breaker 112.

According to various embodiments, the circuit breaker 112 may operate in a networked environment using logical connections to remote network devices through network 110, such as a wireless network, the Internet, or another type of network. The circuit breaker 112 may connect to network 110 through a network interface component 204 connected to the system bus 222. It should be appreciated that the network interface component 204 may also be utilized to connect to other types of networks and remote computing systems. The circuit breaker 112 also includes an input/output controller 206 for receiving and processing input from a number of other devices, including a touch user interface display screen or another type of input device. Similarly, the input/output controller 206 may provide output to a touch user interface display screen or other output devices.

The mass storage device 216, the RAM 210, and the flash memory 214 of the circuit breaker 112 can store software instructions and data. The software instructions include an operating system 218 suitable for controlling the operation of the circuit breaker 112. The mass storage device 216 and/or the RAM 210 and flash memory 214 also store software instructions and applications 224, that when executed by the microprocessor 202, cause the circuit breaker 112 to provide the functionality of the circuit breaker 112 discussed in this Specification.

Figure 3:
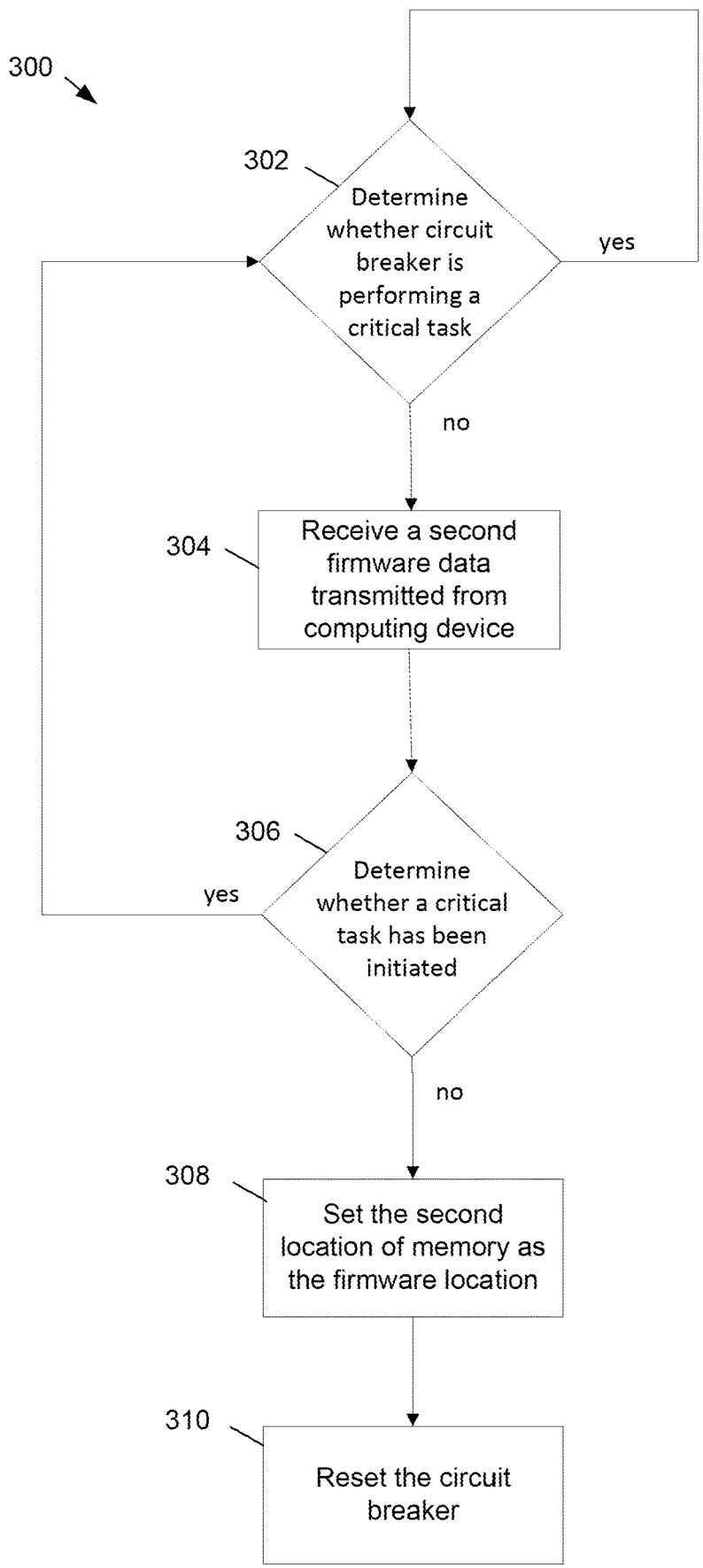
FIG. 3 shows an example method of transferring firmware implemented by the system of FIG. 1, according to some embodiments.

FIG. 3 shows an example method 300 of transferring firmware implemented by the system 100 of FIG. 1, according to some embodiments.

At 302, the microprocessor 202 of the circuit breaker 112 determines whether the circuit breaker 112 is performing a task that is already in progress. In some embodiments, referring to the foreground tasks addressed above, if a critical task is being performed, then the transfer of firmware will not occur. If a critical task is not being performed, the method 300 continues at block 304.

At 304, a second firmware data is received by the circuit breaker 112 transmitted from a computing device, such as user devices 102, 104, and 106. The circuit breaker 112 already has a first firmware data stored in the first location memory 228 of RAM 210. The first location memory 228 is the firmware location for executing the circuit breaker 112 according to the first firmware data.

At 306, the method 300 includes determining whether the transfer of the second firmware is complete. If it is determined that the transferring of firmware is not complete, then the method 300 returns to block 302 to determine whether a critical task is being performed by the circuit breaker 112. If the transfer of the second firmware is complete, then the method proceeds to box 308.

At 308, the microprocessor 202 sets the second location of memory 230 as the firmware location. In some embodiments, the firmware location would be indicated with a flag.

Last, at 310, the circuit breaker 112 is reset to execute the second firmware data stored at the second location of memory 230 to operate the circuit breaker 112 according to the second firmware data. In some embodiments, a notification output indicates that the execution of the second firmware data is complete. In some embodiments, the second firmware data stored in the second location memory 230 is prevented from being executed in response to the reset not being complete.

Figure 4:
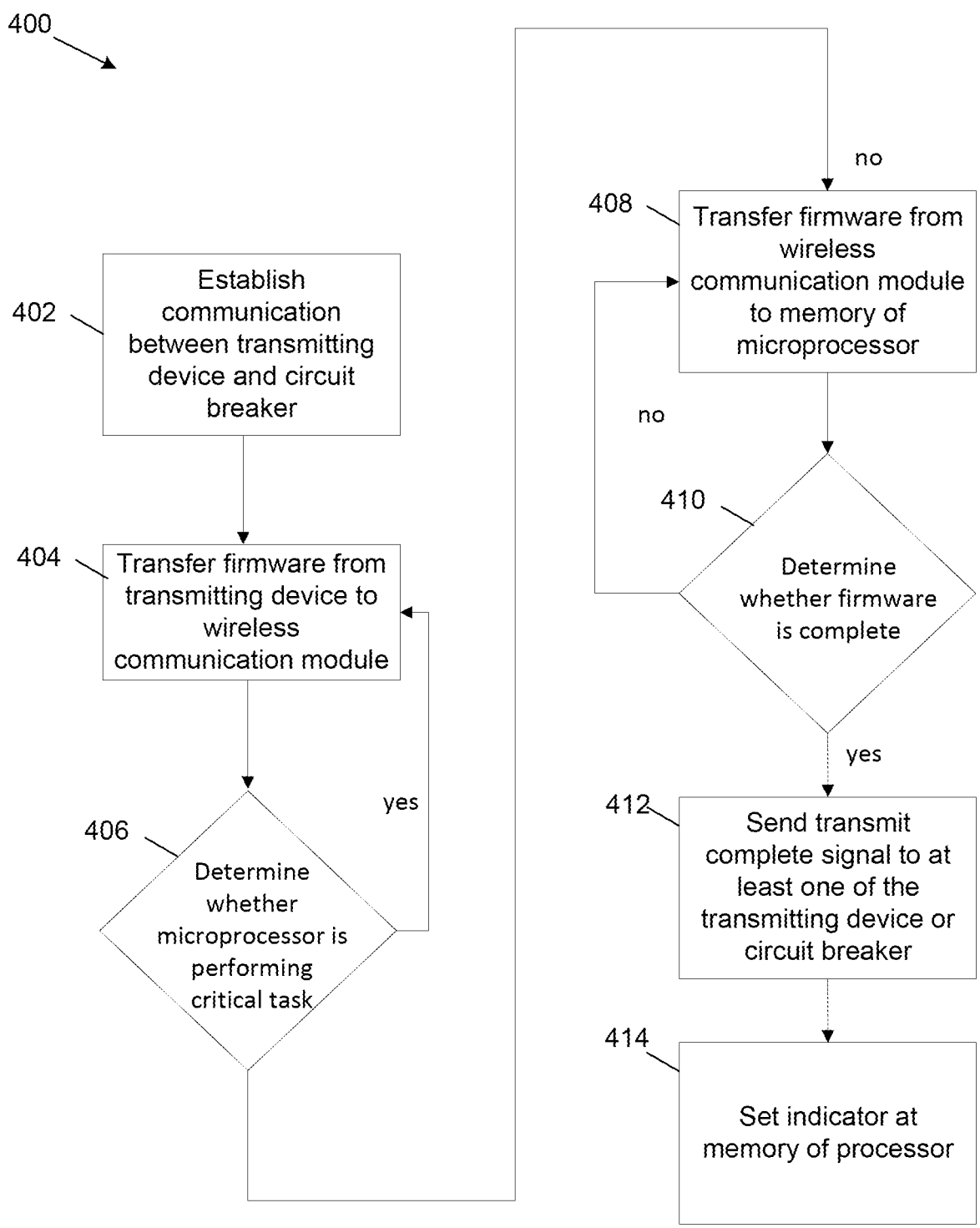
FIG. 4 shows another example method of transferring firmware by the system of FIG. 1, according to some embodiments.

FIG. 4 shows another example method 400 of transferring firmware by the system 100 of FIG. 1, according to some embodiments.

At 402, establish a communication between the transmitting device and the circuit breaker 112. In some embodiments, the transmitting device may be the user devices 102, 104, and 106.

At 404, the firmware is transferred from the transmitting device to the wireless communication module 236 via network 110. In some embodiments, the remote device is a mobile computing device.

At 406, the method 400 includes determining whether the microprocessor 202 performs a critical task. If the microprocessor performs a critical task, the method 400 continues to check whether the microprocessor 202 performs the critical task by looping back into box 406. In some embodiments, if the circuit breaker 112 is performing a critical task, the second firmware data is prevented from being stored in the second location memory 230 of the circuit breaker 112.

At 408, in response to the microprocessor 202 not performing a critical task, the method 400 includes transferring the firmware (or a portion of the firmware) from the wireless communication module 236 to the system memory 208 of the microprocessor 202. In some embodiments, the memory of the microprocessor 202 may be the first location memory 228 of RAM 210, where it will eventually be transferred to the second location memory 230. In some embodiments, the memory of the microprocessor 202 may be the second location memory 230 of the flash memory 214.

At 410, the method 400 includes determining whether the firmware download is complete to the second location memory 230. If the firmware download is not complete to the second location memory 230, then the method 400 returns to block 406 to determine whether a critical task is being performed. In some embodiments, portions of the firmware will be stored in the second location memory 230; however, the firmware download will not be considered complete until the entire firmware download is stored in the second location memory 230. In some embodiments, in response to the firmware download being incomplete, the method 400 includes determining whether the microprocessor 202 is performing a critical task using the foreground state processing. In some embodiments, in response to the microprocessor 202 performing a critical task, transferring of the firmware is delayed until the critical task is complete.

At 412, in response to the firmware download being complete, the method 400 includes sending a transmission complete signal to at least one of the transmitting devices (i.e., user devices 102, 104, and 106) or the circuit breaker 112.

At 414, the method 400 includes setting an indicator at the second location of memory 230 of the microprocessor 202, indicating that the firmware is complete. In some embodiments, the indicator may be a flag. In some embodiments, the flag indicates a location of a most recently downloaded firmware to be used upon reset of the circuit breaker 112. In some embodiments, in response to a reset, the flag is read by the microprocessor 202 to determine where the most recently downloaded firmware is stored. In some embodiments, the most recently downloaded firmware is executed by the circuit breaker 112.

Although various embodiments are described herein, those of ordinary skill in the art will understand that many modifications may be made thereto within the scope of the present disclosure. Accordingly, it is not intended that the scope of the disclosure in any way be limited by the examples provided.

Aspects:

It is to be appreciated that any one of aspects 1-9 can be combined with any one of aspects 10-19 or 20. Any one of aspects 10-19 can be combined with aspect 20.

Aspect 1. A method, comprising: determining, by a microprocessor of a circuit breaker, whether the circuit breaker is performing a task which is already in progress; wherein when the determining is that the circuit breaker is performing the task, storing a second firmware data to a second location of memory; receiving, by the circuit breaker, the second firmware data transmitted from a computing device, wherein the circuit breaker already has a first firmware data stored in a first location of memory, and wherein the first location of the memory being a firmware location for execution to operate the circuit breaker according to the first firmware data; and setting, by the microprocessor of the circuit breaker, the second location of the memory as the firmware location, wherein resetting of the circuit breaker executes the second firmware data at the second location to operate the circuit breaker according to the second firmware data.

Aspect 2. The method of aspect 1, further comprising: outputting a notification indicating that the execution the second firmware data is complete.

Aspect 3. The method of one of aspects 1 or 2, wherein the circuit breaker is a low-voltage circuit breaker.

Aspect 4. The method of any one of aspects 1-3, wherein the resetting of the circuit breaker is a software reset; or opening and closing of the circuit breaker.

Aspect 5. The method of any one of aspects 1-4, wherein when the determining is that the circuit breaker is performing the task, the second firmware data is prevented from being stored to the second location of the memory of the circuit breaker.

Aspect 6. The method of any one of aspects 1-5, wherein the second firmware data stored to the second location of the memory of the circuit breaker is prevented from being executed in response to the resetting not being completed.

Aspect 7. The method of any one of aspects 1-6, wherein the resetting is in response to receiving an indication of a test button being depressed on the circuit breaker.

Aspect 8. The method of any one of aspects 1-7, wherein in response to a test initiated by the test button being depressed failing, preventing the second firmware data from being loaded.

Aspect 9. The method of any one of aspects 1-8, wherein the circuit breaker and the computing device are connected to each other via a wireless interface.

Aspect 10. A method, the method comprising: establishing a communication between a transmitting device and a circuit breaker; transferring a firmware from the transmitting device to a wireless communication module of the circuit breaker; determining whether a microprocessor of the circuit breaker is performing a critical task; and in response to the microprocessor of the circuit breaker not performing the critical task: transferring a portion of the firmware from the wireless communication module of the circuit breaker to a memory of the microprocessor of the circuit breaker; determining whether the firmware is complete; and in response to the firmware being complete, a transmit complete signal is sent to at least one of the transmitting device or the circuit breaker.

Aspect 11. The method of aspect 10, further comprising: in response to the firmware being incomplete, determining whether the microprocessor of the circuit breaker is performing the critical task.

Aspect 12. The method of one of aspects 10 or 11, further comprising: in response to the microprocessor of the circuit breaker performing the critical task, delaying transferring the firmware until the critical task is complete.

Aspect 13. The method of any one of aspects 10-12, further comprising: setting an indicator at the memory of the microprocessor of the circuit breaker, the indicator indicating that the firmware is complete.

Aspect 14. The method of any one of aspects 10-13, wherein the indicator is a flag.

Aspect 15. The method of any one of aspects 10-14, wherein the flag indicates a location of a most recent downloaded firmware to be used upon a reset.

Aspect 16. The method of any one of aspects 10-15, wherein in response to the reset, reading the flag by the microprocessor of the circuit breaker to determine where the most recent downloaded firmware is stored.

Aspect 17. The method of any one of aspects 10-16, wherein the most recent downloaded firmware is executed by the circuit breaker.

Aspect 18. The method of any one of aspects 10-17, wherein the firmware is downloaded onto the transmitting device from a remote device using the wireless communication module.

Aspect 19. The method of any one of aspects 10-18, wherein the remote device is a mobile computing device.

Aspect 20. A device, comprising: a memory; and a processor operatively coupled to the memory, the processor configured to: determine, by a microprocessor of a circuit breaker, whether the circuit breaker is performing a task which is already in progress; wherein when the determination by the microprocessor is that the circuit breaker is performing the task, storing a second firmware data to a second location of the memory; receive, by the circuit breaker, the second firmware data transmitted from a computing device, wherein the circuit breaker already has a first firmware data stored in a first location of the memory, and wherein the first location of the memory being a firmware location for execution to operate the circuit breaker according to the first firmware data; and set, by the microprocessor of the circuit breaker, the second location of the memory as the firmware location, wherein a reset of the circuit breaker executes the second firmware data at the second location to operate the circuit breaker according to the second firmware data.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:
   determining, by a microprocessor of a circuit breaker, whether the circuit breaker is performing a task, the circuit breaker including a first firmware data stored in a first location of memory of the circuit breaker;
   receiving from a computing device, by the circuit breaker, a second firmware data for storage in a second location of the memory of the circuit breaker;
   storing the second firmware data in the second location of the memory of the circuit breaker responsive to the determining of absence of the performing of the task;
   setting for execution, by the microprocessor of the circuit breaker, the second firmware data in the second location of the memory responsive to determining absence of the performing of the task;
   preventing execution, by the microprocessor of the circuit breaker, of the second firmware data at the second location responsive to absence of completion of a reset of the circuit breaker;
   executing, by the microprocessor of the circuit breaker, the second firmware data at the second location responsive to the completion of the reset of the circuit breaker.

2. The method of claim 1, further comprising:
   outputting a notification indicating that the execution of the second firmware data is complete.

3. The method of claim 1, wherein the circuit breaker is a low-voltage circuit breaker.

4. The method of claim 1, wherein the reset of the circuit breaker is a software reset; or opening and closing of the circuit breaker.

5. The method of claim 1, wherein the completion of the reset is in response to receiving an indication of a test button being depressed on the circuit breaker.

6. The method of claim 1, wherein the circuit breaker and the computing device are communicatively coupled via a wireless interface.

7. A method, the method comprising:
   establishing a communication between a transmitting device and a circuit breaker;
   transferring a firmware from the transmitting device to a wireless communication module of the circuit breaker;
   determining whether a microprocessor of the circuit breaker is performing a critical task; and
   in response determining an absence of the performing of the critical task by the microprocessor of the circuit breaker:
     transferring, by the microprocessor, a portion of the firmware from the wireless communication module to a memory communicatively coupled to the microprocessor;
     determining whether the firmware is complete;
     transmitting, responsive to the firmware being complete, a transmit complete signal to at least one of the transmitting device or the circuit breaker; and
     preventing execution, by the microprocessor, of firmware that is transferred to the memory in absence of completion of a reset of the circuit breaker;
     executing, by the microprocessor, the firmware responsive to the completion of the reset of the circuit breaker.

8. The method of claim 7, further comprising:
   in response to the firmware being incomplete, determining whether the microprocessor of the circuit breaker is performing the critical task.

9. The method of claim 8, further comprising:
   in response to the microprocessor of the circuit breaker performing the critical task, delaying transferring the firmware until the critical task is complete.

10. The method of claim 7, further comprising:
    setting an indicator at the memory of the microprocessor of the circuit breaker, the indicator indicating that the firmware is complete.

11. The method of claim 10, wherein the indicator is a flag.

12. The method of claim 11, wherein the flag indicates a location of a most recent downloaded firmware to be used upon a reset.

13. The method of claim 12, wherein in response to the completion of the reset, reading the flag by the microprocessor of the circuit breaker to determine where the most recent downloaded firmware is stored.

14. The method of claim 7, wherein the firmware is downloaded onto the transmitting device from a remote device using the wireless communication module.

15. The method of claim 14, wherein the remote device is a mobile computing device.

16. A system, comprising:
- a circuit breaker having memory and a processor;
- the processor is operatively coupled to the memory and configured to:
  - determine whether the circuit breaker is performing a task, the circuit breaker including a first firmware data stored in a first location of the memory;
  - receive, from a computing device different from the circuit breaker, a second firmware data for storage in a second location of the memory;
  - store the second firmware data in the second location of the memory responsive to the determination of absence of the performing of the task;
  - set for execution the second firmware data in the second location of the memory as the firmware location responsive to the determination of the absence of the performing of the task;
  - prevent execution of the second firmware data at the second location responsive to absence of completion of a reset of the circuit breaker; and
  - execute the second firmware data at the second location responsive to the completion of the reset of the circuit breaker.

\* \* \* \* \*